United States Patent [11] 3,600,878

| [72] | Inventor | Roy Durward Lynch<br>903 Jefferson Drive, Plainview, Tex. 79072 |
|---|---|---|
| [21] | Appl. No. | 824,112 |
| [22] | Filed | May 13, 1969 |
| [45] | Patented | Aug. 24, 1971 |

[54] DEMOUNTABLE, UNITIZED ROW CROP GATHERING UNIT FOR BROADCAST COMBINES
9 Claims, 6 Drawing Figs.

[52] U.S. Cl. .................................................. 56/119
[51] Int. Cl. .............................................. A01d 45/02
[50] Field of Search .......................................... 56/94, 99, 100, 119

[56] References Cited
UNITED STATES PATENTS

| 2,449,603 | 9/1948 | Hammon | 56/119 |
| 2,836,026 | 5/1958 | Gray et al. | 56/119 |
| 2,862,345 | 12/1958 | Wigham | 56/119 X |
| 2,948,100 | 8/1960 | McEachern | 56/119 |
| 3,018,601 | 1/1962 | Griffin et al. | 56/119 |

Primary Examiner—Louis G. Mancene
Assistant Examiner—J. A. Oliff
Attorney—Wayland D. Keith ABSTRACT: A structural frame for use on broadcast combines to support upright, stalk-gathering cylindrical members as a unit, separately and independently of any permanent connections to the combine, and which structural frame may be clamped onto a conventional broadcast combine to enable the combine to be converted into a row-harvesting unit. Four bolt clamps connect the structural frame to the combine and by connecting an endless-drive member having a transverse shaft mounted thereon, enables ready use thereof. Complementary pairs of upright cylindrical members, mounted on the combine, are rotated in opposed relation to direct stalks of row crops, such as maize, kafir corn, corn, legumes and the like, into the sickle of the combine. Provision is made to truss the structural frame to enable the unit to be supported on the combine above the sickle thereof in rigid relation. Further provision is made to enable the removing and replacing the entire unit, by the use of a hoist, in a minimum of time.

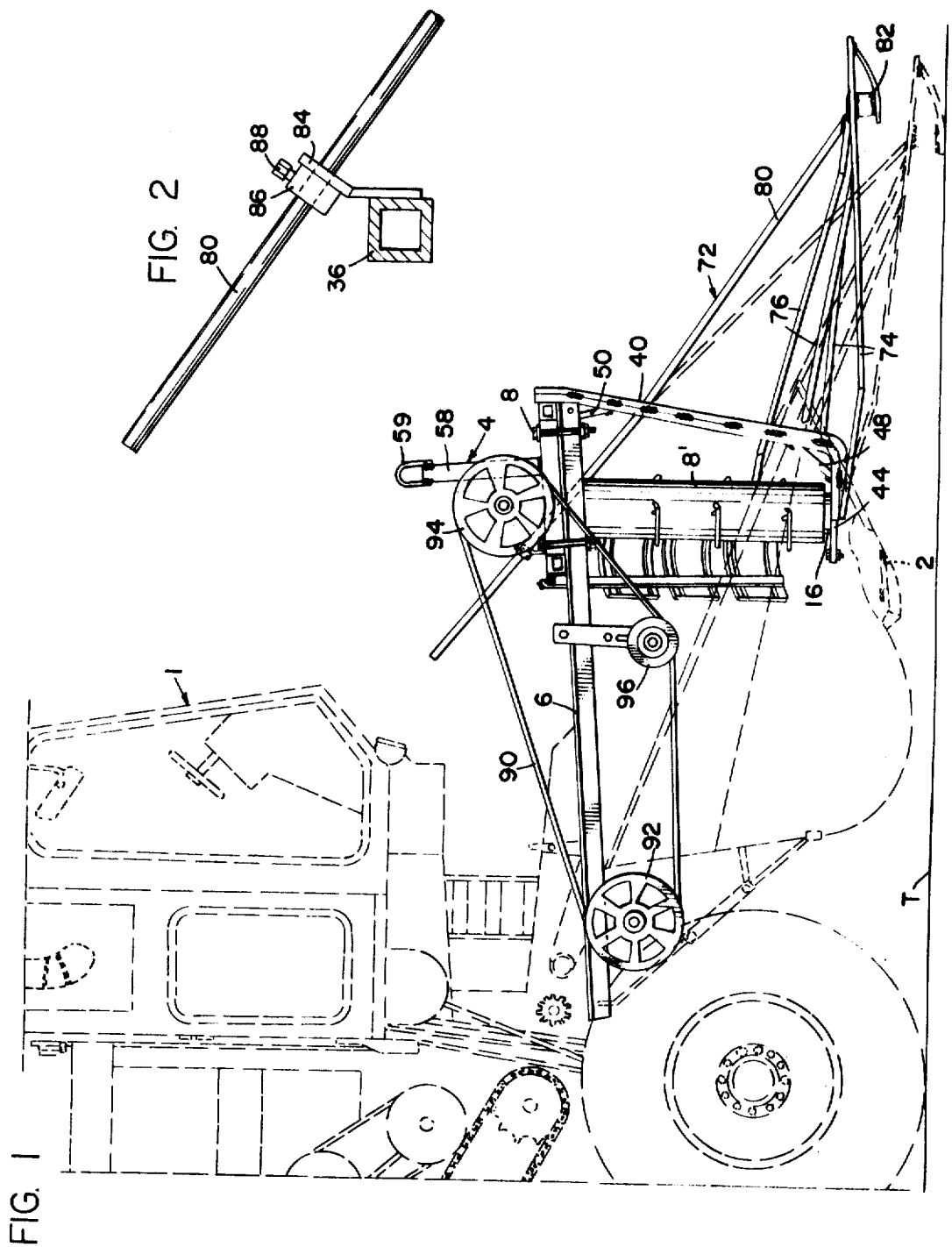

ROY DURWARD LYNCH
INVENTOR.

BY

*Wayland D. Keith*

HIS AGENT

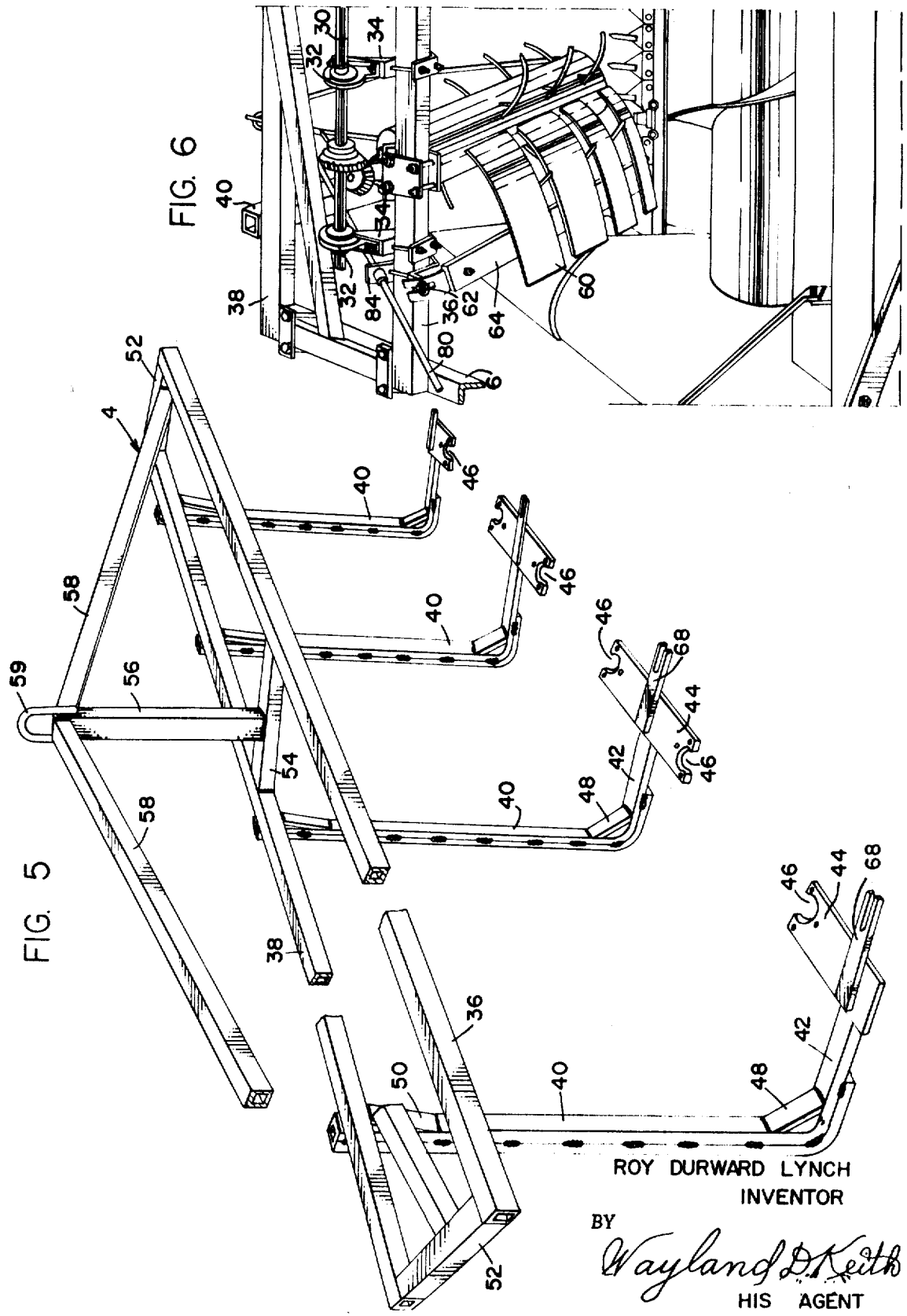

DEMOUNTABLE, UNITIZED ROW CROP GATHERING UNIT FOR BROADCAST COMBINES

This invention relates to an attachment for combines and more particularly to an auxiliary frame attachment for combines, which frame supports a plurality of pairs of upright cylinders for gathering stalks into position to be cut by the sickle of a conventional combine. The present device is used in conjunction with a grain-gathering attachment for combines, such as shown in the U.S. Pat. to McEachern, No. 2,948,100, issued Aug. 9, 1960.

In the aforementioned patent to McEachern, the cylindrical members and shafts were attached to the combine as individual elements, which required time to assemble these parts thereonto and to disassemble the parts therefrom, when the combine needed to be used without the pairs of cylindrical members, such as used for cutting maize, kafir, corn and other grains and legumes which are planted in rows.

The present device is so constructed that the entire transverse shaft assembly and the pairs of cylindrical stalk-gathering members, together with the stalk-pickup devices and the shields for removing the stalks from the fingers on the rotating shields, are all mounted on a structural frame in operative relation, which frame may be clamped onto the combine by two pairs of clamps, and the structural frame with associated mechanisms is moved, by a hoist, to be set into place so that the lower ends of the cylindrical members will be slightly above the sickle, thereby obviating the necessity of removing or replacing any bolts associated with the sickle.

An object of this invention is to provide a detachable structural support frame for supporting pairs of cylindrical members for moving stalks into gathered relation to be cut by the sickle of a combine.

Another object of the invention is to provide a demountable structural frame for supporting stalk-gathering mechanisms and stalk-pickup mechanisms as a composite unit, which unit may be removed and replaced in a short period of time without disturbing the adjustment of elements thereon.

Still a further object of the invention is to provide a truss-type, tubular structural support frame for pairs of stalk-gathering cylinders, which is light in weight, which may be clamped in place and with a shaft thereon connected in driven relation to a course of power for driving the upright stalk-gathering cylinders.

Still another object of the invention is to provide a structural support frame for pairs of upright cylindrical members which frame is mounted on the upper portion of the combine and is supported entirely above the sickle of the combine, without the necessity of having attachment means connected therewith.

Still another object of the invention is to provide a support frame for cylindrical members of a combine which is simple in construction, light in weight, low in the cost of manufacture.

With these objects in mind and others which will become manifest as the description proceeds, reference is to be had to the accompanying drawings, in which like reference characters designate like parts in the several views thereof, in which:

FIG. 1 is a fragmentary side elevational view of a broadcast combine, shown in dashed outline, showing the present device in full outline, attached thereto, with the stalk-pickup attachment shown in one position in dashed outline, and another position thereof being shown in full outline;

FIG. 2 is a fragmentary elevational view of a portion of the stalk-pickup adjusting device with parts broken away and with parts shown in section;

Figure 3:
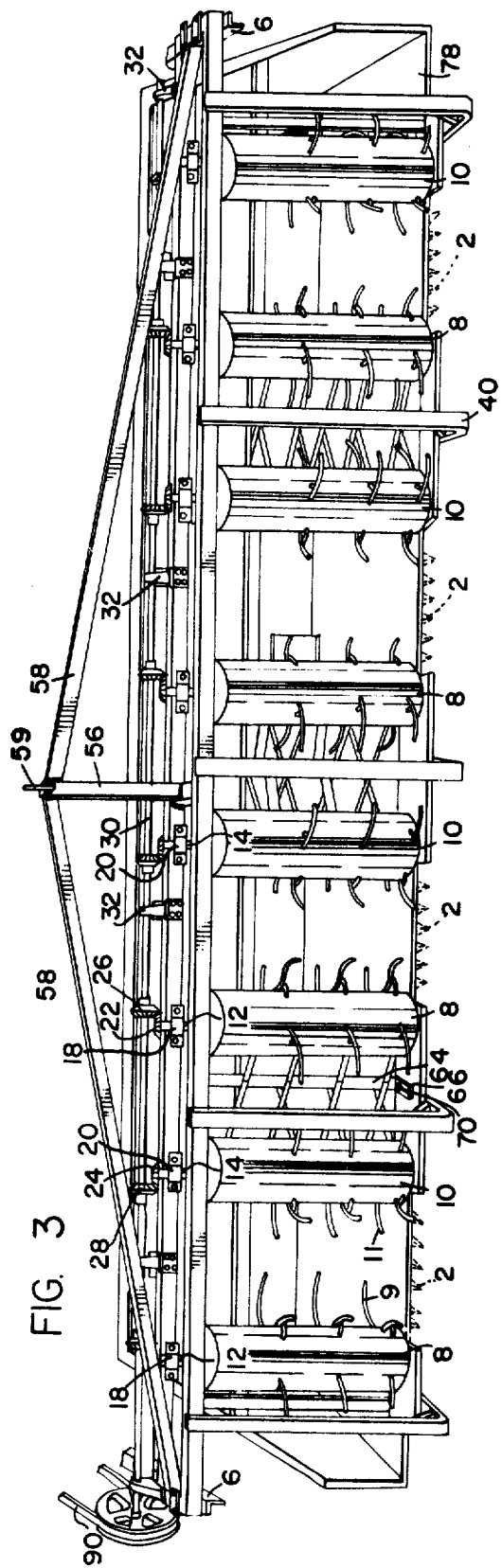
FIG. 3 is a front elevational view of the lower front portion of the combine, showing the present demountable frame mounted thereon, and showing the transverse shaft and upright cylinders mounted thereon in geared relation, but with the stalk-pickup device removed therefrom.
Figure 4:
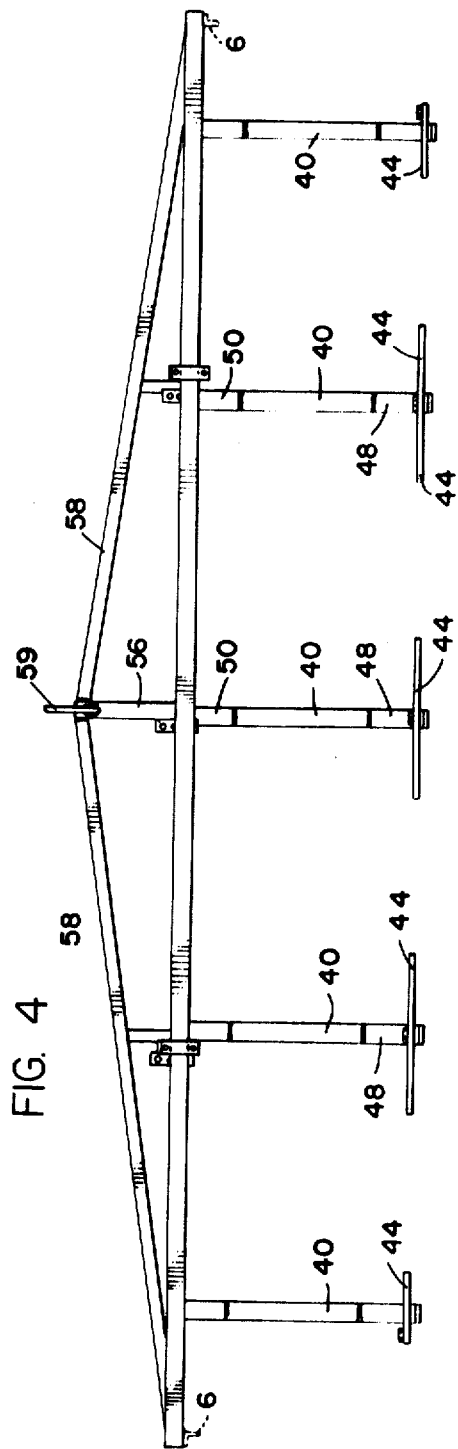
FIG. 4 is a rear elevational view of the frame, with the transverse shaft, gearing, bearings, upright cylinders and other mechanism removed therefrom to show the structure of the frame.

FIG. 5 is an enlarged, perspective view of the frame shown apart from the combine and the mechanism associated therewith, with parts broken away and with parts shortened to bring out the details of construction; and FIG. 6 is a fragmentary perspective view taken from above and at an angle, to show the mechanism associated with an end of the demountable frame and showing the clamps which attach the demountable frame to a support member on the combine.

With more detailed reference to the drawings, the numeral 1 designates generally a conventional, self-propelled, broadcast combine, which has a conventional reciprocating sickle 2.

A trussed, demountable frame, preferably of tubular or structural material, is designated generally at 4, and is of a length to extend across outwardly extending support bars 6 on the combine 1, which frame is clamped in place by bolt clamps 8, preferably two at each end, whereby, by removing one bolt from each clamp, the frame 4, on which upright cylinder members 8 and 10 are mounted, may be removed, as a unit, from the combine. The lower ends of the respective shafts 12 and 14 are mounted in journaled relation in bearings 16 which bearings are mounted in support plates 44 on the inwardly extending portion 42 of downwardly depending members 40. Bearings 18 and 20 journal the upper ends of shafts 12 and 14 so the bevel gears 22 and 24, which are mounted on shafts 18 and 20, respectively, will mesh with companion bevel or mitre gears 26 and 28, which gears 28 are mounted on transverse shaft 30.

The transverse shaft 30 is journaled in bearings 32, which bearings are on brackets 34, which brackets are detachably secured to one of the transverse beam members 36 of demountable frame 4. The opposite transverse beam member 38, of the demountable frame 4, has downwardly depending support members 40 mounted thereon. Each downwardly depending support member 4 has the lower end thereof extending outwardly as indicated at 42, on each which outwardly extending end portion 42 is mounted a support plate 44. The end support plates 44 each have a cutaway portion 46 in which to mount bearings 16, so as to support the outermost upright cylinder members 8' and 10. The intermediate plates 44 have spaced apart, cutout portions 46 to receive bearings 16 therein, so as to maintain the shafts 12 and 14, of the upright cylinder members 8' and 10 in proper spaced-apart relation. The plates 44 are preferably secured to the outwardly extending portions 42, as by welding.

Each of the downwardly depending members 40 has a brace 48 abridging the bend between the upright portion 40 and the outwardly extending portion 42 thereof. In addition to the upright portions 40 being welded to transverse member 38, a brace 50 is welded intermediate the inner portion of transverse member 38 and the adjacent face of the downwardly depending member 40, as will best be seen in FIGS. 1 and 5.

End members 52 extend between transverse members 36 and 38 and are secured in place, as by welding. A further transverse member 54 is positioned intermediate the ends of transverse members 36 and 38 and is secured thereto by welding and forms a support member for truss post 56. A pair of angulated structural members 58, such as square tubular members, are secured to the upper end of truss post 56 and to the end members 52, as by welding, to form a trussed frame, to support the weight of pairs of cylinder members 8' and 10, as well as transverse shaft 30, the gearing and associated structure. The transverse members 36 and 38, end members 52 and truss post support member 54, the angulated structural members 58 and downwardly depending members 40 make up the demountable, structural frame, which is designated generally by the number 4.

A support loop 59 is mounted at the apex of the angulated structural members 58 and is secured to the upper end of truss post 56 so as to provide a loop to which a hoist may be readily connected for lifting the entire unit from the combine, which demountable frame 4 and the associated mechanisms, can be lifted from the combine when the bolt clamps, 8 are disconnected, and when an endless transmission drive member 90 is disconnected from around transmission wheels or sprockets 92, 94 and 96. The sprocket or pulley 96 is an adjustable idler member, and by moving this idler member the endless transmission drive member 90 may be loosened and removed therefrom without severing the endless transmission drive member.

Stalk-cleaning shields 60 are secured to transverse member 36, as by bolts 62, as will best be seen in FIG. 6. The lower end of each vertical support member 64 is inturned and bifurcated, as indicated at 66, and is secured in adjusted relation to the respective bifurcated members 68 which are mounted on the respective support plates 44. A bolt 70 secures these members 64 and 68 in interlocked relation, which enables the cylinders 8' and 10, having fingers 9 and 11 thereon, to be secured in place on outwardly extending members 6 on the combine 1 in rigid relation above sickle 2 for ready removal of the entire unit, by the removal of four bolts from bolt clamps 8. This also enables the removal of the forwardly extending stalk-pickup fingers 72 therewith.

Each stalk-pickup device, designated generally at 72, preferably has lower, forwardly extending rods 74, which are secured to the plates 44 and extend forwardly into the middle between the rows and connect with a shoe 82, each which shoe passes between the crop rows, and each shoe is forward of the respective downwardly depending members 40. Other rods 76 assist in guiding the stalks between upright cylindrical members 8' and 10, so that the fingers 9 and 11 will direct the stalks against the sickle to be severed and directed onto the conveyor table 78 to be conveyed into the threshing portion of the combine.

Adjustment rods 80 extend from the shoe 82 upwardly to pass through apertured lugs 84, which rods 80 each have a set collar 86 thereon. Therefore, by adjusting the respective set screws 88, the rods 80 may be moved upward or they may be lowered to adjust the shoe 82 relative to the terrain T, as indicated in full and dashed outlines in FIG. 1. The apertured lugs 84 on transverse member 36 will permit free sliding movement of rods 80 upwardly therethrough, so upon adjusting set collars 86 in fixed relation with respect to rods 80, upon engagement of the shoe 82 with an obstruction, the rods are freely slidable upward until the shoe is disengaged from the obstruction, whereupon, the set collars 86 will move back into abutting relation with upstanding apertured lug 84, and maintain the shoe 82 in adjusted relation with respect to the terrain.

Having thus clearly shown and described the invention what is claimed as new and desired to be secured by Letters Patent is:

1. A demountable, unitized row crop, stalk-gathering device for attachment to a broadcast combine having a sickle, which gathering device comprises;
    a. a pair of spaced-apart, elongated transversely extending members,
    b. a member interconnecting said transversely extending members near each end thereof to form an elongated rectangular frame,
       1. attachment means detachably securing said frame to the combine,
    c. a plurality of spaced-apart, downwardly depending members secured to said elongated frame,
       1. a first inturned portion on the lower end of each said downwardly depending members which extends beneath said frame,
       2. a plate secured to each inturned portion of each of said downwardly depending members and extending transversely thereof, each said plate having bearing receiving means on adjacent transversely spaced ends thereof,
       3. a bearing associated with each bearing-receiving means,
    d. upright shafts,
    1 upright cylinders, one mounted on each of said upright shafts, each of which shafts is journaled in a respective one of said bearings,
    2. outwardly extending stalk-gathering fingers on each of said cylinders,
    3. bearings associated with said frame and being journaled on each said upright shaft near the upper end thereof,
    e. a gear mounted on each of said upright shafts, near the upper end thereof,
    f. a transverse shaft mounted on said frame in journaled relation with respect thereto,
    g. spaced-apart gears fixedly secured to said transverse shaft, which spaced gears are in meshed relation with the respective gears mounted near the upper ends of said upright shafts to rotate adjacent cylinders in opposite directions, and
    h. power means connected in driving relation with said transverse shaft.

2. A demountable, unitized, row crop, stalk-gathering device, as defined in claim 1; wherein
    a. an upright standard is mounted on said frame intermediate the length thereof, and
    b. a pair of angulated members are secured to said frame near the ends thereof and to said upright standard near the upper end thereof to form a truss for said frame.

3. A demountable, unitized, stalk-gathering device, as defined in claim 2; wherein
    a. a further member is positioned intermediate the length of said transversely extending members and is connected in abridging relation therewith, and
    b. said upright standard is secured to said further member.

4. A demountable, unitized, row crop, stalk-gathering device, as defined in claim 1; wherein
    a. a second inturned portion, having an opening formed therein, is associated with each of said first inturned portions and extends parallel thereto,
    b. shield-mounting members, the lower end of each of said shield-mounting members being connected in complementary relation with each of said second inturned portions,
       1. a plurality of vertically spaced, horizontally arranged shields secured to each of said shield-mounting members, thereby to form horizontal slots between said horizontally arranged shields for rotation of said fingers on said upright cylinders therebetween to remove stalks therefrom, and
    c. means detachably connecting the upper end of each of said shield-mounting members to said frame.

5. A demountable, unitized, row crop, stalk-gathering device, as defined in claim 2; wherein
    a. connecting means is associated with the upper portion of said upright standard to receive hoisting means to enable the stalk-gathering device to be moved relative to the combine.

6. A demountable, unitized, row crop, stalk-gathering device, as defined in claim 1; wherein
    a. a stalk-pickup device is secured to said frame and extends forwardly thereof,
    b. a shoe, having an arcuate runner on the lower side thereof, which shoe is secured to the forward end of said stalk-pickup device,
    c. an apertured lug mounted on said frame,
    d. a rod extending upwardly from said shoe and passing through the aperture in said lug, and
    e. an abutment adjustably secured on said rod on the side of said lug remote from said shoe to support the outwardly extending portion of said stalk-pickup device.

7. A demountable, unitized, row crop, stalk-gathering device, as defined in claim 6; wherein
    a. said abutment adjustably secured on said rod is a collar, and
    b. screw-threaded bolt means bindingly engaging said collar in adjusted, fixed relation on said rod.

8. A demountable, unitized, row crop, stalk-gathering device, as defined in claim 1; wherein
    a. said attachment means for detachably securing said frame to the combine are bolt clamps.

9. A demountable frame for a unitized, row crop, stalk-gathering device for attachment to a broadcast combine having a sickle, which frame of the stalk gathering unit comprises;
 a. a pair of spaced-apart, elongated, transversely extending members,
 b. members interconnecting said transversely extending members near each end thereof to form a rectangular frame,
  1. a further member intermediate the length of the transversely extending members and connecting said transverse by extending members together,
  2. an upright standard mounted on said member which is connected intermediate the length of said transversely extending members,
  3. a pair of angulated members connected to said frame near each end thereof and extending upward and connected to said upright standard near the upper end thereof to form a truss,
 c. spaced-apart, downwardly depending members secured to one of said transverse members,
 d. an inwardly extending portion on each of said downwardly depending members and extending beneath said frame formed by said transversely extending members,
  1. a plate secured to each inturned portion of each of said downwardly depending members and extending transversely thereof, each said plate having bearing receiving means on adjacent transversely spaced ends thereof,
  2. a bearing associated with each bearing-receiving means,
 e. upright shafts,
  1. upright cylinders, one mounted on each of said upright shafts, each of which shafts is journaled in a respective one of said bearings,
  2. outwardly extending stalk-gathering fingers on each of said cylinders,
  3. bearings associated with said frame and being journaled on each said upright shaft near the upper end thereof,
 f. a gear mounted on each of said upright shafts near the upper end thereof,
 g. a transverse shaft mounted on said frame in journaled relation with respect thereto,
 h. spaced-apart gears fixedly secured to said transverse shaft, which spaced gears are in meshed relation with the respective gears mounted near the upper ends of said upright shafts to rotate adjacent cylinders in opposite directions, and
 i. power means connected in driving relation with said transverse shaft.